United States Patent [19]
Glenn et al.

[11] Patent Number: 4,665,754
[45] Date of Patent: May 19, 1987

[54] PRESSURE TRANSDUCER

[75] Inventors: Max C. Glenn; Raymond F. McMullen, both of Minnetonka; David B. Wamstad, Roseville, all of Minn.

[73] Assignee: Honeywell Inc., Minneapolis, Minn.

[21] Appl. No.: 721,106

[22] Filed: Apr. 8, 1985

[51] Int. Cl.$^4$ .............................................. G01L 9/06
[52] U.S. Cl. .................. 73/727; 29/610 SG; 73/708; 338/4; 338/42
[58] Field of Search ................ 73/727, 721, 726, 720, 73/708, DIG. 4; 338/4, 42; 29/610 SG

[56] References Cited
U.S. PATENT DOCUMENTS 4,364,276 12/1982 Shimazoe et al. ............... 73/721
4,399,707 8/1983 Wamstad ............................ 73/727

OTHER PUBLICATIONS

Shadrin et al., Instruments and Experimental Techniques, vol. 18, No. 2, pt. 2, pp. 559-560.
Johnson, R. L. et al; "An Advanced Solid State Pressure Transducer for High Reliability SSME Application;" pp. 320-331, (presented Jun. 27-29, 1984 at the George C. Marshall Space Flight Center, Huntsville, Alabama; published following presentation).

*Primary Examiner*—Donald O. Woodiel
*Attorney, Agent, or Firm*—William T. Udseth

[57] ABSTRACT

Disclosed is a pressure transducer comprising a pressure sensitive silicon die having a front side exposing piezoresistive means and a back side for receiving pressure from a pressure medium. The transducer further comprises a pressure vessel having an aperture and apparatus including a hermetic seal for mounting the die with the front side of the die facing the aperture. In this manner, the die is compressed toward the pressure vessel when positive pressure is applied to the back side of the die by the pressure medium.

38 Claims, 12 Drawing Figures

PRESSURE TRANSDUCER

BACKGROUND OF THE INVENTION

The Government has rights in this invention pursuant to Contract No. NAS8-34769 awarded by the National Aeronautics and Space Administration.

The present invention comprises a pressure sensitive silicon die and relates to an improved apparatus for housing the die. The present invention is an improvement of the device disclosed in U.S. Pat. No. 4,399,707.

SUMMARY OF THE INVENTION

The present invention is a pressure transducer comprising a pressure sensitive silicon die having a front side exposing piezoresistors, and a back side for receiving pressure from a pressure medium. The transducer further comprises a pressure vessel having an aperture and apparatus including a hermetic seal for mounting the die with the front side of the die facing the aperture so that the die is compressed toward the pressure vessel when positive pressure is applied to the back side of the die by the pressure medium.

BRIEF DESCRIPTION OF THE DRAWINGS

FIGS. 6a–6c and 7a–7c illustrate in more detail support members 72 and 74 which are part of the embodiments illustrated in FIGS. 4 and 4a.

DETAILED DESCRIPTION OF THE PREFERRED EMBODIMENTS

Figure 1:
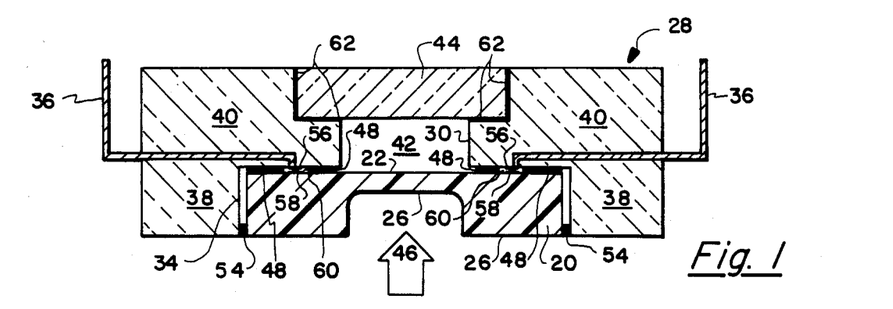
FIGS. 1 and 2 illustrate a preferred embodiment of a pressure transducer comprising a flip-chip mounted pressure sensor.
Figure 2:
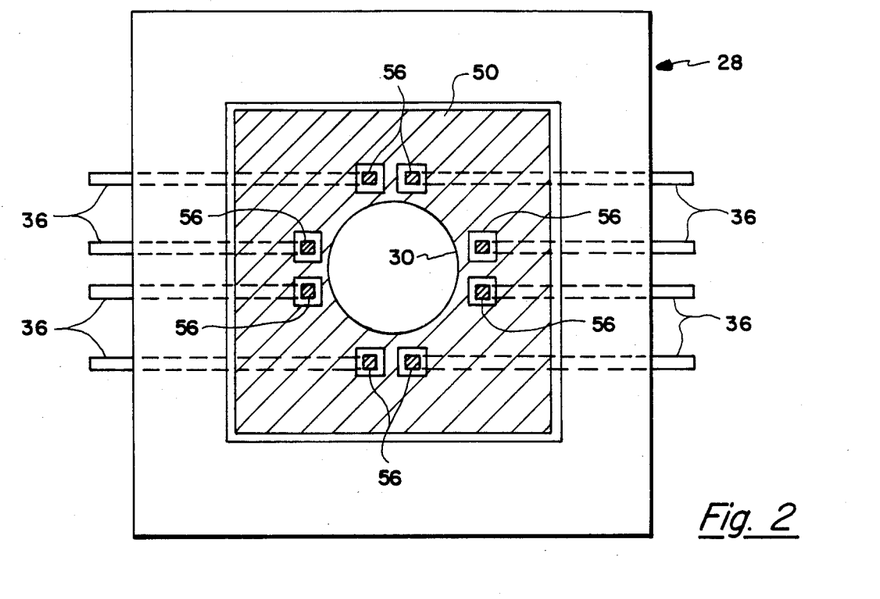
Figure 3:
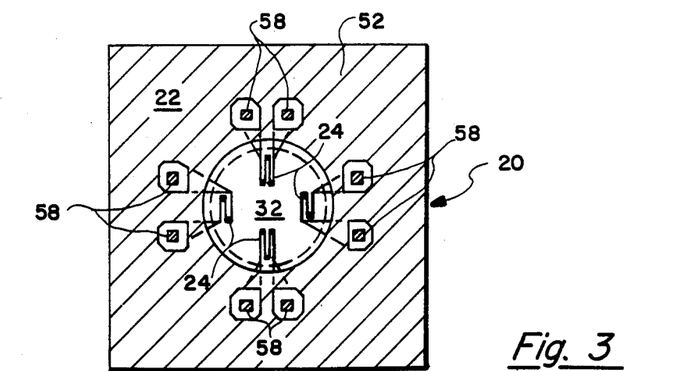
FIG. 3 illustrates a pressure sensitive silicon die compatibile with the present invention.

FIGS. 1, 2 and 3 illustrate a pressure transducer comprising a pressure sensitive silicon die 20 having a front side 22 exposing circuitry comprising piezoresistive means 24 and a back side 26 for receiving pressure from a pressure medium. The transducer further comprises a pressure vessel 28 having an aperture 30 and means including a hermetic seal 48 for mounting die 20 with front side 22 of the die facing aperture 30 so that die 20 is compressed toward pressure vessel 28 when positive pressure is applied to back side 26 of the die by a pressure medium.

Die 20 normally comprises a central sensing portion 32 which typically includes the piezoresistive means 24 comprising piezoresistors, typically diffused into die 20 for providing a piezoresistive output signal related to the pressure sensed by the die. Piezoresistive means 24 may comprise thin film laser-trimmable resistors serving to vary the resistance of the piezoresistor itself and/or the sensitivity or offset of the die output, as by, for example, resistors coupled to an amplifier in associated circuitry. Die 20 may have a variety of cross sections, including the alternate cross sections illustrated in FIGS. 1 and 4.

Pressure vessel 28 may comprise a chip carrier having a deep square-shaped recess or recessed portion 34 adapted to receive chip 20. The 3M Company, among others, supplies complete chip carrier units of various configurations. In the embodiment illustrated, a plurality of metal conductors 36 are provided integral to chip carrier 28, leads 36 being hermetically sealed between portions 38 and 40 of the chip carrier. Leads 36 comprise part of means for providing electrical connection to piezoresistive means 24 as will be further discussed below.

In the embodiment shown in FIG. 1, pressure vessel 28 defines an evacuated interior volume 42 comprising aperture 30, volume 42 being hermetically sealed between window 44 and die 20, both of which are hermetically sealed to chip carrier 28 as is also further discussed below. In this configuration, the pressure transducer illustrated provides an absolute pressure sensor, volume 42 serving as a vaccuum pressure reference, with pressure medium 46 being applied to back side 26 of die 20.

The embodiment illustrated in FIG. 1 has the advantages (1) of compressing die 20 toward pressure vessel 28 when a positive pressure 46 is applied (as opposed to forcing die 20 away from or off of pressure vessel 28) and (2) of protecting piezoresistive means 24 exposed at surface 22 from environmental damage and caustic pressure medium by enclosing piezoresistive means 24 within chamber 42.

In an alternate embodiment created by removing window 44, the pressure transducer shown in FIG. 1 serves as a differential pressure sensor, the preferred application comprising application of a higher pressure 46 to back side 26 and a lower pressure to side 22 of die 20. In such an embodiment, higher pressure 46 still compresses die 20 toward pressure vessel 28 rather off of or away from the vessel.

In FIG. 1, a hermetic seal 48 is shown for mounting the die with piezoresistive means 24 positioned over aperture 30. Hermetic seal 48 comprises a hermetic seal 48 between vessel 28 and front side 22 of die 20. Hermetic seal 48 is maintained in compression when a positive pressure 46 is applied to back side 26 of die 20 by a pressure medium. Accordingly, the embodiment illustrated in FIG. 1 has the further advantage of maintaining hermetic seal 48 in compression (rather than stressing hermetic seal 48 in the opposite direction and causing it to break). Hermetic seal 48 is typically formed by reflowing solder 48 between substantially matching metalization regions 50 and 52 on pressure vessel 28 and die 20 respectively.

Alternately, or in addition, a similar solder hermetic seal 54 could be made between the periphery of recess 34 and the outer periphery of die 20.

The embodiment shown in FIG. 1 is a preferred embodiment for some applications in that the front side of die 20 comprises means for flip-chip mounting die 20 to a pressure vessel; pressure vessel 28 also comprises means for flip-chip mounting die 20 over aperture 30 in the pressure vessel; and the die is flip-chip mounted so that die 20 is positioned over aperture 30.

The means for flip-chip mounting comprises bonding pads 56 on pressure vessel 28, bonding pads 56 being electrically connected to leads 36, and bonding pads 58 on die front surface 22, bonding pads 58 being electrically connected to piezoresistive means 24. Bonding pads 56 and 58 are located on pressure vessel 28 and die front surface 22 respectively so that, when die 22 is flip-chip mounted to vessel 28, corresponding bonding pads 56 and 58 are substantially in register. Between each corresponding bonding pad 56 and 58 is a solder bump 60 which is reflowed between the bonding pads.

Accordingly, the embodiment illustrated in FIG. 1 has substantial advantages in a high production pressure transducer since hermetic seals 48 and/or 50 and solder bumps 60 and, if applicable, peripheral hermetic seal 54 and window hermetic seal 62, can be reflowed simultaneously, thus providing a manufacturing process highly compatible with large and economical production runs.

If coverplate 44 is made of transparent material, piezoresistive means 24 on die 20 can be laser-trimmed after the transducer is assembled. In this manner, a high-production, low-cost transducer can also be made precise by removing or adjusting for residual affects that occur upon transducer assembly.

Figure 4:
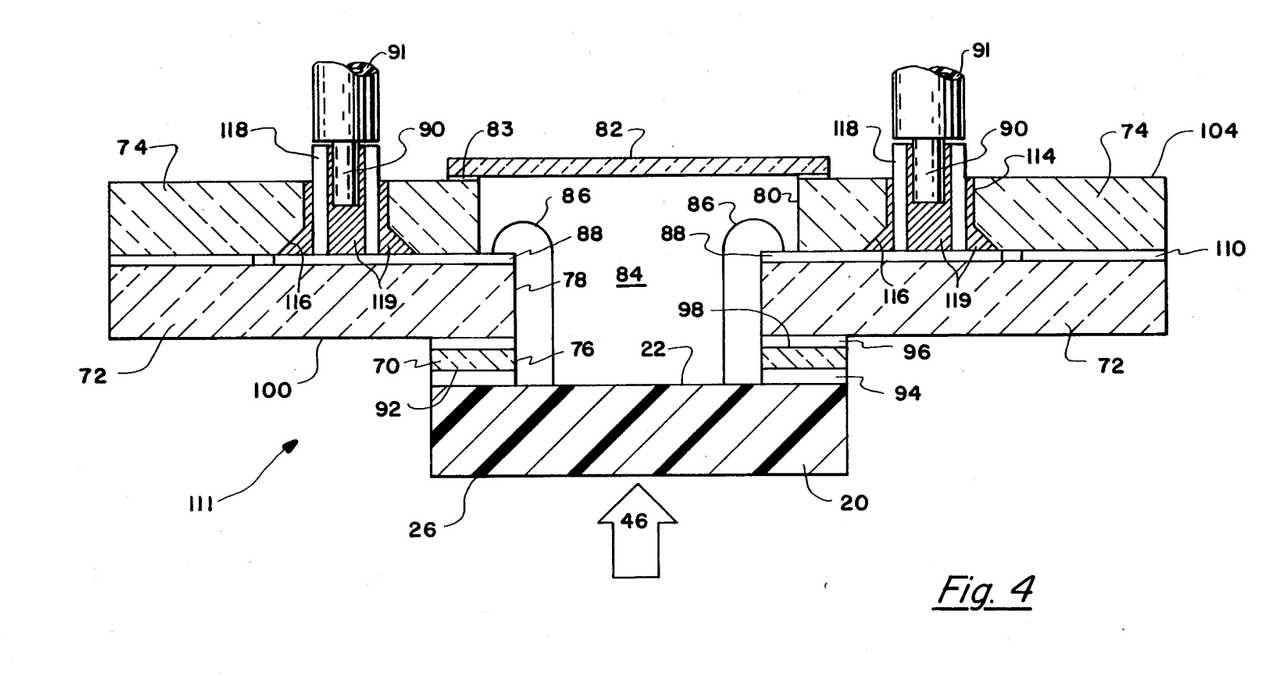
FIGS. 4 and 4a illustrate alternate preferred embodiments of a pressure transducer.

An alternate preferred embodiment of the present sensor is illustrated in FIG. 4. This embodiment, which is designed to function over a very high range of temperature extremes and to pressures of up to 20,000 psi, comprises silicon die 20; first, second and third washer-like support members 70, 72 and 74 respectively; and hermetic seals, which will be further described below, between these components.

As with the embodiment illustrated in FIG. 1, die 20 is compressed toward the pressure vessel (which comprises washer-like support members 70, 72 and 74) when a positive pressure 46 is applied to back side 26 of die 20 by a pressure medium. As is also the case with the embodiment illustrated in FIG. 1, hermetic seals between the components of the pressure vessel are maintained in compression when a positive pressure 46 is applied to back side 26 of die 20.

Washer-like support members 70, 72 and 74 each have central apertures 76, 78 and 80 respectively, and these apertures are located substantially in register with one another. In an absolute pressure sensor embodiment (the embodiment illustrated in FIG. 4), third washer-like support member 74 supports a hermetically sealed coverplate 82, and central apertures 76, 78 and 80 together with die 20 and coverplate 82 form an evacuated pressure reference chamber 84. The vaccuum reference is established by heating the parts (coverplate 82 and the assembled support comprising die 20 and members 70, 72 and 74) and outgasing at a temperature slightly below the melting point of the solder used for solder seal 83; this solder, which is placed between matching metalized portions (not shown) on coverplate 82 and support member 74, would normally have a lower melting point than the solder used in the assembled support and could, for example, comprise 99.85-99.90 percent tin. Coverplate 82 is placed on the assembled support while the parts are still in the vaccuum. The temperature is then raised to melt solder 83 and is then lowered to solidify the solder while the parts are still in the vaccuum.

If coverplate 82 is made of a transparent material, piezoresistive means 24 on die 20 (see FIG. 3) can be laser-trimmed after the transducer is assembled, thus enhancing the precision of the sensor.

In an alternate embodiment (not illustrated) coverplate 82 is removed, thus forming a differential pressure sensor with its preferred application having the higher measured pressure on back side 26 of die 20 with the lower pressure typically being applied to side 22 of die 20.

As with die 20 illustrated in the embodiment of FIG. 1, die 20 in the present embodiment comprises piezoresistive means 24. In the embodiment illustrated in FIG. 4, electrical connection is made to piezoresistive means 24 by way of wire bonds 86, thin film metal conductors 88, and electrical terminals 90, all of which are explained further below.

In the preferred embodiment, first, second and third washer-like support members 70, 72 and 74 each have a thermal coefficient of expansion substantially matching the thermal coefficient of expansion of die 20. In one preferred embodiment, first washer-like support member 70 is made of a borosilicate glass such as Corning Glass Company type 7740 sold under the trademark "Pyrex" or Corning type 7720 or 3320 glass; support member 70 could also be fabricated of silion or silicon nitride. In this preferred embodiment, washer-like support members 72 and 74 are preferrably made of silicon nitride although members 72 and 74 may also be made either of silicon or of borosilicate glass. For an application requiring pressures 46 of up to 20,000 psi, silicon or silicon nitride is preferred from a strength standpoint to glass, since glass in tension typically has a tensile strength design limit of 10,000 psi.

Although dimensions are not critical, in one preferred embodiment, first washer-like support member 70 has an outside diameter of 0.325 inch, and the diameter of aperture 76 is 0.130 inch; the thickness of member 70 in this embodiment is 0.020 inch. Note that in the embodiment illustrated the diameter of aperture 76 substantially defines a central sensing portion of die 20, that sensing portion being surrounded by a mounting portion which interfaces with one surface of support 70. Aperture 76 in support member 70 is substantially in register with piezoresistive means 24.

In order to form a hermetic seal 94 between front side 22 of die 20 and a mating surface 92 of first washer-like support member 70, the mating portions of surface 22 (without metalization 52) and surface 92 are lapped flat to within one-half wavelength of sodium light (approximately four millionths of an inch). In addition, the surfaces lapped flat to within four millionths of an inch are lapped so that no series of digs or pits separated by three pit diameters or less, when combined, cross the entire surface in a radial direction, and so that the surfaces are free of scratches that cross the entire surface in a radial direction. The preferred process of bonding these lapped surfaces together and forming a hermetic seal 94 between them is to bring both die 20 and support member 70 up to a temperature of approximately 350 degrees to 500 degrees Centigrade, then apply a 1000 volt DC electric potential across the parts so as to develope an electrostatic bonding process. Alternately, a solder layer 94 may be reflowed between metalized portions of surfaces 92 and 22 on member 70 and die 20 respectively; however, such a solder layer is undesirable because of yielding, which will make sensor performance non-repeatable.

Figure 7A:
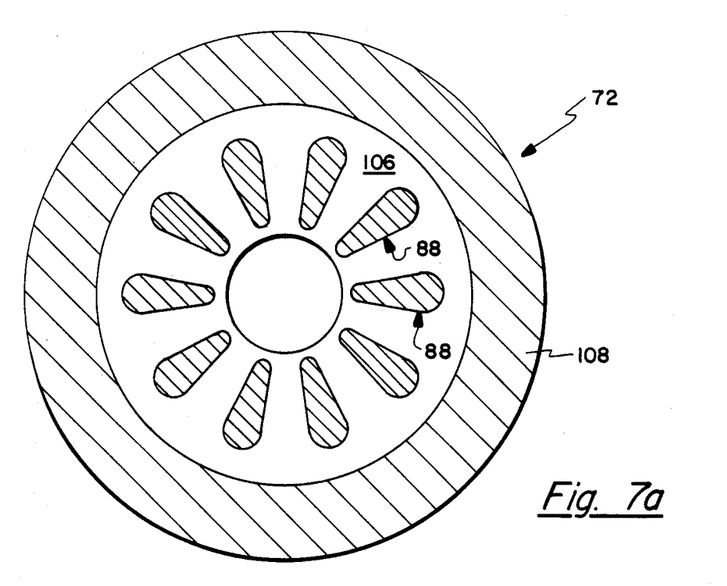
Figure 7B:
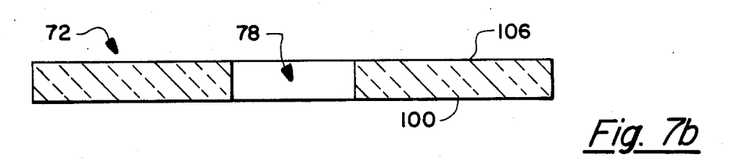
Figure 7C:
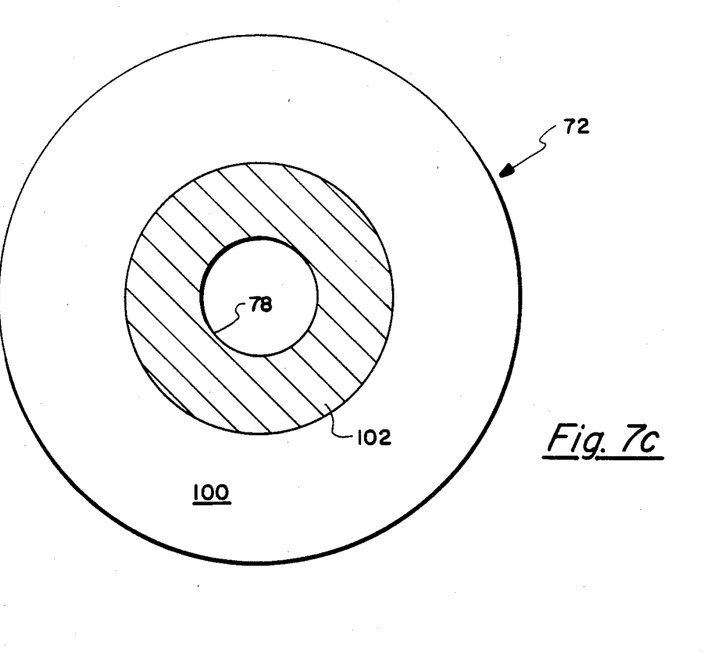

A hermetic seal 96 between the other surface 98 of support member 70 and one surface 100 of support member 72 is typically formed by matching metalization patterns on surfaces 98 and 100 together with solder seals between the two metalized layers. In the embodiment illustrated, a metal region 102 (see FIG. 7c) is sputter deposited in a pattern adjacent to central aperture 78 in a circular pattern substantially matching adjoining surface area 98 of support member 70. A matching metalization layer is also typically applied to surface 98 of support member 70. These metal layers typically comprise Ti/Pt/Au or Ti-W/Ni/Au. Other metalization layer schemes are also possible.

In addition, it has been found that good hermeticity between surfaces such as 98 and 100 can best be formed if these surfaces are first prepared to a flatness of 0.0002 inch and are free of scratches larger than eight microinch ($8 \times 10^{-6}$ inch).

As has just been indicated, one end surface 100 of second support member 72 comprises means for hermetically bonding member 72 to surface 98 of first member 70. In the embodiment illustrated, the other end surface 106 of support member 72 (see FIG. 7a) supports 10 elongated, radially-oriented thin film metal conductors 88 and a metalized region 108 configured to form part of a hermetic seal 110 between second and third support members 72 and 74. Thin film metal conductors 88 and metalized region 108 may be formed of Ti/Pt/Au or Ti-W/Ni/Au or other metal layer(s) as previously described.

Each of a plurality of wire bonds 86 are connected between a bonding pad or region 58 (see FIG. 3) on front side 22 of die 20 and a thin film metal conductor 88 (see FIG. 4) on surface 106 of second support member 72.

Figure 6A:
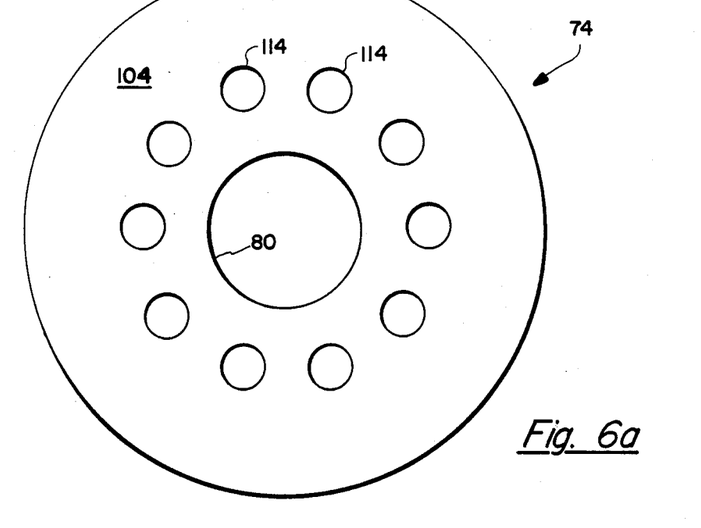
Figure 6B:
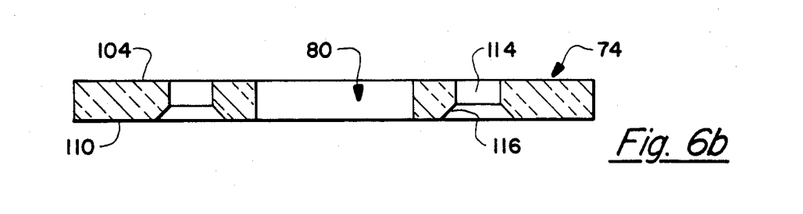
Figure 6C:
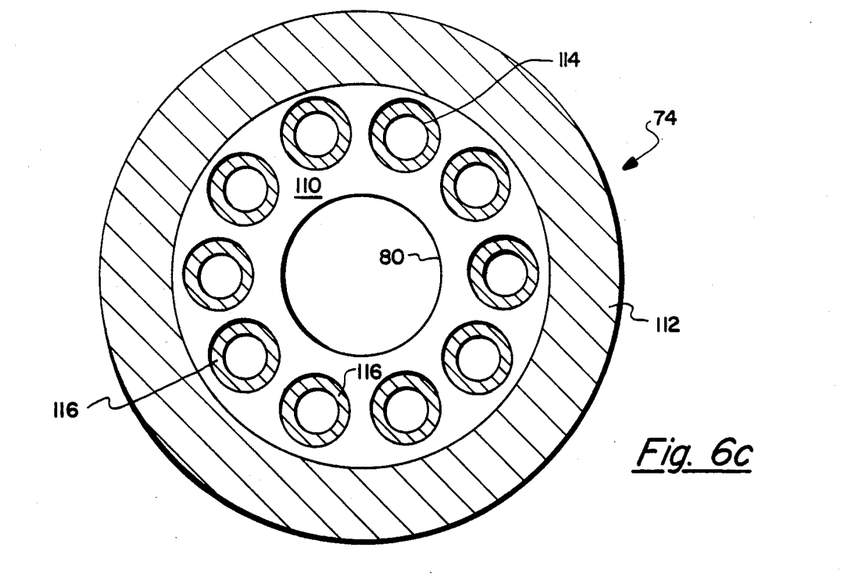

A preferred configuration of third washer like support member 74 is illustrated in FIGS. 6a, 6b, and 6c. In order to form hermetic seal 110 between support members 72 and 74, one end surface 110 of support member 74 comprises means for hermetically bonding member 74 to surface 106 of support member 72. Accordingly, surface 110 comprises a metalized region 112 (typically of Ti-W/Ni/Au) substantially matching the configuration of metalized region 108 on surface 106. A hermetic solder seal is formed between these two surfaces.

Central aperture 80 in third washer-like support member 74 is typically of a diameter larger than the diameter of apertures 76 and 78 in support members 70 and 72 so that aperture 80 in support member 74 surrounds the wire bond connections on surface 106 of support member 72.

While dimensions are not critical, in one preferred embodiment, support members 72 and 74 have outside diameters of 0.570 inch and 0.560 inch, one diameter being smaller than the other to reduce alignment problems; the diameters of apertures 78 and 80 are 0.130 inch and 0.170 inch respectively; and the thickness of support members 72 and 74 in this embodiment are 0.050 inch.

In addition to central aperture 80, support member 74 comprises a plurality of additional apertures 114. When support members 72 and 74 are assembled as shown in FIG. 4, each aperture 114 is substantially in register with a different thin film metal conductor 88 on surface 106 of support member 72. An electrical terminal 90 passes through each additional aperture 114 and is connected to a thin film metal conductor 88 in register with the aperture.

Each additional aperture 114 also includes a hermetic seal, the preferred embodiment of which is illustrated in FIG. 4. One of the challenges of providing a hermetic seal in each aperture 114 around each electrical conductor or terminal 90 is that conductors 90 typically comprise copper, which has a substantially different thermal coefficient of expansion than the material comprising support 74, which as previously noted, has a thermal coefficient of expansion substantially matching the thermal coefficient of expansion of die 20. Since the structure of the embodiment illustrated in FIG. 4 is designed to function over very wide temperature extremes, the hermetic seal must take into account these extreme differences in thermal coefficient of expansion. Accordingly, the preferred embodiment employs a tube 118 of Invar material placed into each aperture 114 to form a region of low thermal coefficient of expansion between copper terminal 90 and silicon nitride support plate 72. Invar, a trademark of Imphy S.A., Paris, France, is here intended to define a metal typically comprising 36 percent nickel, 0.35 percent manganese, and the balance iron with carbon and other elements kept to a minimum.

The hermetic seal for each aperture 90 is formed primarily by a solder seal similar to those used in other portions of the present invention. Each aperture 114 comprises a flanged portion 116 which forms a chamfer around the surface-110 side of support 74. The inside of each aperture 114, including chamfered surface 116, may be metalized, e.g., with Ti-W/Ni/Au, as previously discussed. Solder 119 is placed between Invar tube 118 and the metalized interior of each aperture 114 and chamfered surface 116. Solder 119 is also formed between electrical terminal 90 and the inside diameter of Invar tube 118.

Figure 4A:
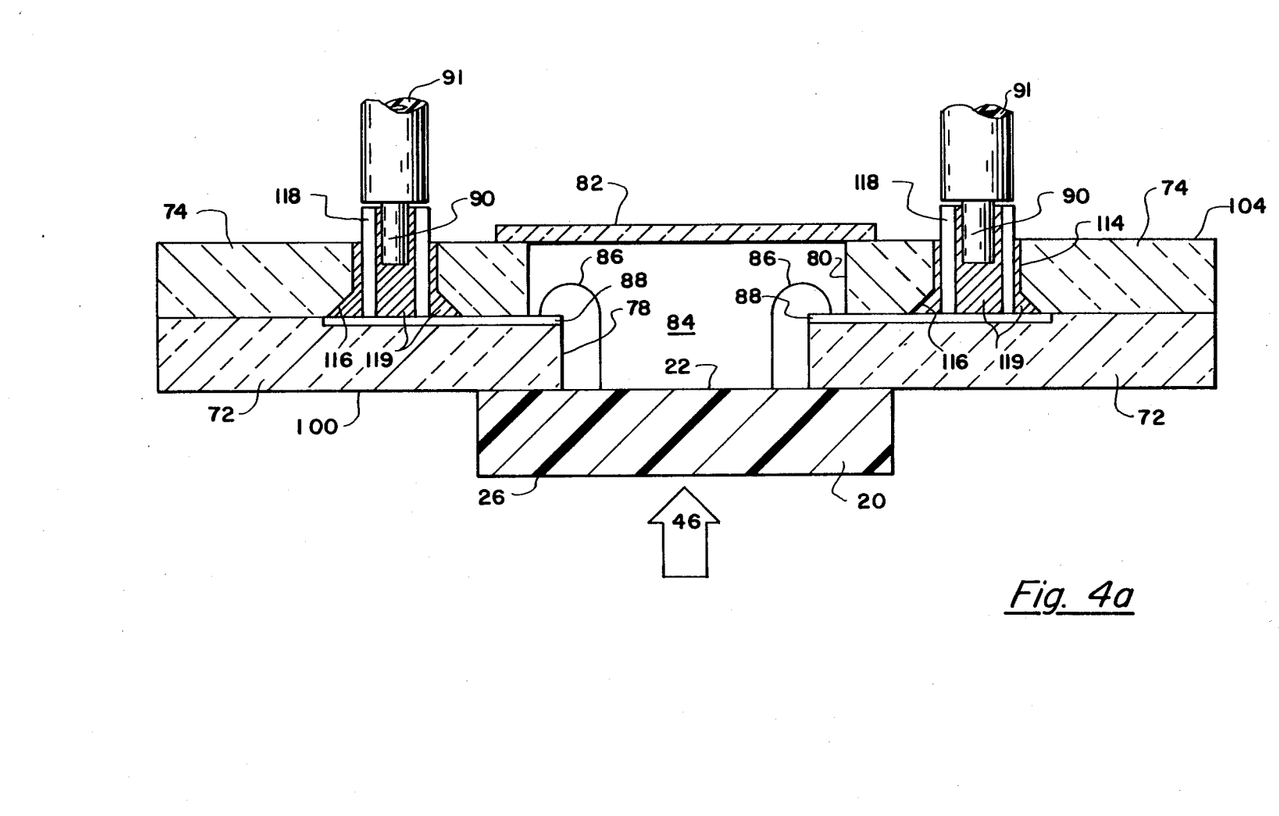

An alternate preferred embodiment to the pressure transducer illustrated in FIG. 4, is one in which support member 70 is eliminated, in which support member 72 is made of a borosilicate glass such as previously disclosed for member 70, and in which support member 80 is fabricated of silicon; further, in such an embodiment, production is greatly simplified since metalizations 112, 108 and 102 can be eliminated and since the electrostatic bonding process previously described for surfaces 22 and 92 can be applied as well to surfaces 100, 106, 110, 104, and the adjoining glass surface of coverplate 82. This embodiment is illustrated in FIG. 4a. Note that metalized regions 88 in this embodiment are recessed into surface 106. These recessed metalizations 88 are formed by first etching out the configuration of each metalization to the desired depth and then metalizing the regions as previously described. All other details of this embodiment could be as discussed for the embodiment of FIG. 4. For most known glasses, the embodiment of FIG. 4a would provide a reliable transducer for ranges up to approximately 10,000 psi, since glass in tension typically has a tensile strength design limit of approximately 10,000 psi.

Figure 5:
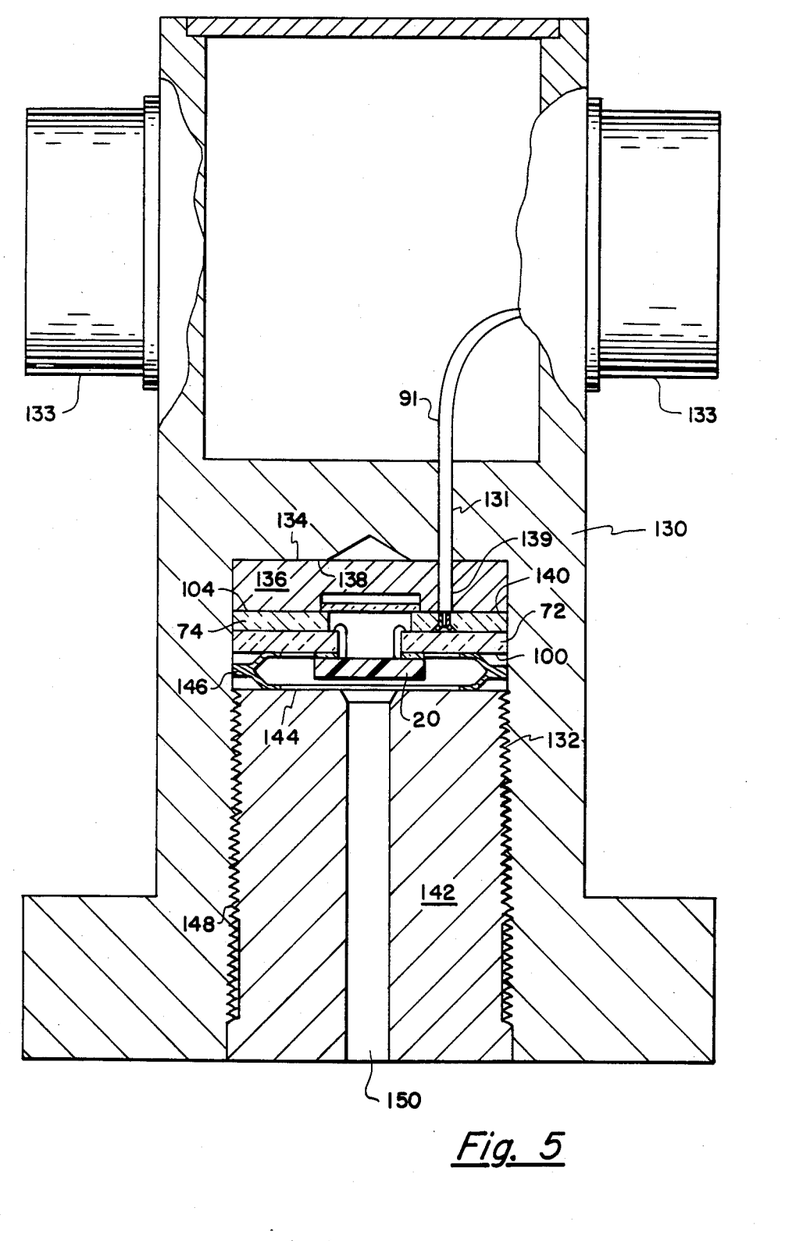
FIG. 5 illustrates a pressure transducer package.

The pressure transducer illustrated in FIG. 4 was developed to measure the liquid nitrogen pressure level on the main engine of the NASA Space Shuttle. Accordingly, the transducer performance requirements span a wide temperature range and include a very high level of vibration. With this in mind, a preferred pressure transducer package was also developed to maintain the hermeticity of the pressure transducer illustrated in FIG. 4 and to help ensure performance over the extreme environmental conditions. As illustrated in FIG. 5, the preferred pressure transducer package comprises a stainless steel housing 130 having a substantially cylindrical chamber 132 formed into the housing, a first end of chamber 132 comprising a substantially flat surface 134.

The transducer package illustrated also includes a substantially cylindrical interface plate 136 having first and second substantially flat end surfaces 138 and 140 respectively. Surface 138 of interface plate 136 may comprise means for forming a hermetic seal with first end surface 134 of chamber 132. In the preferred embodiment, the hermetic seal between surfaces 134 and 138 is formed by maintaining a flatness of 0.0002 inch on these surfaces, preferably maintaining the surfaces free of scratches larger than eight microinch ($8 \times 10^6$ inch), and coating surface 138 with a polymerized tetrafluoro ethylene film such as Du Pont's Teflon material. Interface plate 136 is preferably made of a material having a low thermal coefficient of expansion such as Invar, a material previously described.

Interface plate 136 in the embodiment shown comprises a plurality of additional apertures 139 each substantially in register with a different aperture 114 in support member 74, the diameter of each aperture 139 typically being just slightly larger than the diameter of insulation 91 covering electrical terminals 90. Housing 130 also comprises additional apertures 131, each of which is also substantially in register with a different aperture 139 in interface plate 136 in order to permit electrical terminals 90 insulated by insulation 91 to pass through housing 130 to external connectors 133.

The package illustrated in FIG. 5 further comprises a pressure transducer as illustrated in FIG. 4 having die 20 mounted to a substantially cylindrical support member (comprising in the preferred embodiment supports 70, 72 and 74) having first and second substantially flat end surfaces 100 (on support 72) and 104 (on support 74).

End surface 140 of interface plate 136 may comprise means for forming a hermetic seal with surface 104 of support member 74. In the preferred embodiment, this hermetic seal is maintained by providing surfaces 104 and 140 with a flatness of 0.0002 inch and scratch free of scratches larger than 8 microinch ($8 \times 10^{-6}$ inch) and by coating surface 140 with a thin film of polymerized tetrafluoro ethylene as previously described for surface 138.

A plug 142 which in the preferred embodiment threads into the open end of chamber 132 forms a hermetic seal at that end of the chamber, plug 142 having a substantially flat surface 144 forming a second end 144 to chamber 132. A compressive ring 146 is located between end surface 100 of support member 72 and substantially flat surface 144 of plug 142. Compressive ring 146 may comprise a v-ring as illustrated; such v-rings are available from a variety of suppliers including Advanced Products, 33 Defco Park Road, North Haven, Conn. 06473. Alternately, compressive ring 146 may comprise a metal o-ring or "c" ring each of which are also commercially available from suppliers including Advanced Products.

Plug 142 is shown threaded into chamber 132 by means of threads 148 which provide means for compressing interface plate 136, pressure transducer 111, and compressive ring 146 together toward first end 134 of chamber 132. Plug 142 is shown comprising an aperture 150 for connecting silicon die 20 to a pressure media.

Interface plate 136 serves several purposes. It provides a surface 140 having a uniform flatness so that surface 104 of support member 74 will transmit uniform stresses to die 20; if surface 104 interfaces with a surface that is not of uniform flatness, die 20 will not provide repeatable results. While flat surface 34 of cylindrical chamber 132 is nominally maintained as a flat surface, it is difficult to machine surface 134 as flat as desired. Therefore, interface plate 136 provides the desired flatness.

In addition, in the embodiment shown, housing 130 is formed of stainless steel. While stainless steel is not a required material for housing 130, if it is used, there is a substantial difference in the thermal coefficient of expansion between stainless steel housing 130 and the cylindrical support member (comprising in the preferred embodiment support 70, 72 and 74) which in the preferred embodiment has a thermal coefficient of expansion substantially the same as that of die 20. Accordingly, by making interface plate 136 of a material such as Invar (previously described) having a low thermal coefficient of expansion, the severe mismatch between the thermal coefficient of expansion of the materials at surface 104 of support member 74 is substantially reduced.

In addition, as previously described, interface plate 136 may comprise means for forming a hermetic seal with the first end surface 134 of chamber 132, and end surface 140 of interface plate 136 may comprise means for forming a hermetic seal with surface 104 of support member 74. These hermetic seals are important in the event that the hermetic seal formed between surface 144 of plug 142 and the adjoining surface of compressive ring 116 should fail; likewise, it provides backup hermeticity in the event that the hermetic seal between surface 100 of support member 72 and the adjoining surface of compressive ring 116 should fail.

The embodiments of the invention in which an exclusive property or right is claimed are defined as follows:

1. A pressure transducer comprising:
   a pressure sensitive silicon die having a front side providing access to piezoresistive means therein at least through electrical interconnections provided thereto, and having a back side for receiving pressure from a pressure medium;
   a pressure vessel having an aperture and having therethrough, other than through the aperture, interconnection means which are in electrical contact with the electrical interconnections; and
   means including a permanent heremetic seal for mounting the die with the front side of the die restrained by the pressure vessel and facing the aperture so that the die is compressed toward the pressure vessel if positive pressure is applied to the back side of the die by the pressure medium.

2. The apparatus of claim 1 wherein the pressure vessel defines an evacuated interior volume comprising the aperture.

3. The apparatus of claim 2 wherein the pressure vessel comprises an optically transparent coverplate apposed to the piezoresistive means.

4. The apparatus of claim 1 wherein the pressure vessel comprises a chip carrier.

5. A pressure transducer comprising:
   a pressure sensitive silicon die having a front side providing access to piezoresistive means therein at least through electrical interconnections provided thereto, and having a back side for receiving pressure from a pressure medium;
   a pressure vessel having an aperture and having therethrough, other than through the aperture, interconnection means which are in electrical contact with the electircal interconnections; and
   means including a permanent hermetic seal for mounting the die with the piezoresistive means positioned adjacent the aperture, the hermetic seal being located between the pressure vessel and the front side of the die so that the hermetic seal is maintained in compression if positive pressure is applied to the back side of the die by the pressure medium.

6. The apparatus of claim 5 wherein the pressure vessel defines an evacuated interior volume comprising the aperture.

7. The apparatus of claim 6 wherein the pressure vessel comprises an optically transparent coverplate apposed to the piezoresistive means.

8. The apparatus of claim 5 wherein the pressure vessel comprises a chip carrier.

9. A pressure transducer, comprising:
a pressure sensitive silicon die having a front side exposing piezoresistive means and a back side for receiving pressure from a pressure medium;
a washer-like support member having first and second end surfaces, the first end surface comprising means for hermetically bonding the member to the front side of the die, the washer-like support member having a central aperture substantially in register with the piezoresistive means, the washer-like support member having a thermal coefficient of expansion substantially matching the thermal coefficient of expansion of the die;
a pressure vessel having an aperture, the pressure vessel having a thermal coefficient of expansion substantially matching the thermal coefficient of expansion of the die; and
means for mounting the second end surface of the washer-like support member to the pressure vessel so that the apertures are substantially in register and so that the die is compressed toward the pressure vessel when positive pressure is applied to the back side of the die by the pressure medium, the means for mounting comprising a hermetic seal between the pressure vessel and the second end surface of the washer-like support member.

10. The apparatus of claim 9 wherein the pressure vessel defines an evacuated interior volume comprising the aperture.

11. The apparatus of claim 10 wherein the pressure vessel comprises an optically transparent coverplate apposed to the piezoresistive means.

12. The apparatus of claim 9 wherein the pressure vessel comprises means for providing electrical connection to the piezoresistive means.

13. A pressure transducer, comprising:
a pressure sensitive silicon die having a front side exposing piezoresistive means and a back side for receiving pressure from a pressure medium;
a washer-like support member having first and second end surfaces, the first end surface facing the front side of the die, the washer-like support member having a central aperture substantially in register with the piezoresistive means, the washer-like support member having a thermal coefficient of expansion substantially matching the thermal coefficient of expansion of the die;
a hermetic seal between the first end surface of the washer-like support member and the front side of the die;
a pressure vessel having a surface facing the second end surface of the washer-like support member, the pressure vessel having an aperture substantially in register with the aperture of the washer-like support member, the pressure vessel having a thermal coefficient of expansion substantially matching the thermal coefficient of expansion of the die;
a hermetic seal between the pressure vessel and the second end surface of the washer-like support member; and
the hermetic seals being maintained in compression when positive pressure is applied to the back side of the die by a pressure medium.

14. The apparatus of claim 13 wherein the pressure vessel defines an evacuated interior volume comprising the aperture.

15. The apparatus of claim 14 wherein the pressure vessel comprises an optically transparent coverplate apposed to the piezoresistive means.

16. The apparatus of claim 13 wherein the pressure vessel comprises means for providing electrical connection to the piezoresistive means.

17. A pressure transducer, comprising:
a pressure sensitive silicon die having a front side exposing piezoresistive means and a back side for receiving pressure from a pressure medium;
a first washer-like support member having first and second end surfaces, one end surface comprising means for hermetically bonding the first member to the front side of the die, the first washer-like support member having a central aperture substantially in register with the piezoresistive means, the first washer-like support member having a thermal coefficient of expansion substantially matching the thermal coefficient of expansion of the die;
a second washer-like support member having first and second end surfaces, one end surface comprising means for hermetically bonding the second member to the other surface of the first washer-like support member, the second washer-like support member having a central aperture substantially in register with the aperture of the first washer-like support member, a portion of the other surface of the second washer-like support member supporting a thin-film metal conductor, the second washer-like support member having a thermal coefficient of expansion substantially matching the thermal coefficient of expansion of the die;
means for connecting the thin-film metal conductor to the piezoresistive means;
a third washer-like support member having first and second end surfaces, one end surface comprising means for hermetically bonding the third member to a portion of the other surface of the second washer-like support member, the third washer-like support member having a central aperture substantially in register with the apertures of the first and second washer-like support members, the third washer like support member having a thermal coefficient of expansion substantially matching the thermal coefficient of expansion of the die, the third washer-like support member further comprising an additional aperture substantially in register with the thin film metal conductor on the other surface of the second washer-like support member;
electrical terminal means passing through the additional aperture and connected to the thin film metal conductor in register with the aperture; and
means hermetically sealing the additional aperture.

18. The apparatus of claim 17 wherein the surfaces hermetically bonded together have a flatness within approximately four millionths of an inch.

19. The apparatus of claim 18 wherein the surfaces hermetically bonded together comprise no series of pits separated by three pit diameters or less that, when combined, cross the entire surface in a radial direction, the surfaces hermetically bonded together further being free of scratches that cross the entire surface in a radial direction.

20. The apparatus of claim 17 wherein the third washer-like support member supports a cover plate hermetically sealed to the other side of the third washer-like support member, the central apertures in the first, second and third washer-like support members, together with the die and cover plate, forming an evacuated pressure reference chamber.

21. The apparatus of claim 20 wherein the cover plate is optically transparent.

22. The apparatus of claim 17 wherein:
the front side of the die comprises a mounting portion flat within approximately four millionths of an inch; and
the end surface of the first washer-like support member hermetically bonded to the front surface of the die is flat within approximately four millionths of an inch.

23. The apparatus of claim 22 wherein the surfaces having a flatness within approximately four millionths of an inch comprise no series of pits separated by three pit diameters or less that, when combined, cross the entire surface in a radial direction, the surfaces having a flatness within approximately four millionths of an inch also being free of scratches that cross the entire surface in a radial direction.

24. The apparatus of claim 17 wherein the other end surface of the first washer-like support member and both end surfaces of the second and third washer-like support members are flat within approximately 0.0002 inch.

25. The apparatus of claim 24 wherein the surfaces having a flatness within approximately 0.0002 inch have a surface finish of 8 microinch and are free of scratches larger than 8 microinch.

26. The apparatus of claim 17 wherein the first washer-like support member comprises borosilicate glass and the second and third washer-like support members comprise silicon.

27. The apparatus of claim 17 wherein the first washer-like support member comprises borosilicate glass and the second and third washer-like support members comprise silicon nitride.

28. The apparatus of claim 17 wherein the first, second and third washer-like support members each comprise a material selected from the group consisting of borosilicate glass, silicon, and, silicon nitride.

29. The apparatus of claim 17 wherein:
the other surface of the second washer-like support member supports a plurality of thin film metal conductors;
the die comprises a plurality of piezoresistive means;
the means for connecting comprises a plurality of wire bonds, there being a wire bond connected between each thin film metal conductor and a different one of the piezoresistive means;
the central aperture in the third washer-like support member has a diameter larger than the diameter of the central aperture in the second washer-like support member so that the central aperture in the third washer-like support member surrounds the wire bond connections with the thin film metal conductors;
the third washer-like support member comprises a plurality of additional apertures each substantially in register with a different thin film metal conductor on the other surface of the second washer-like support member;
each additional aperture surrounding electrical terminal means connected to the thin film metal conductor in register with the aperture; and means hermetically sealing each additional aperture.

30. The apparatus of claim 29 wherein the third washer-like support member supports a coverplate hermetically sealed to the other side of the third washer-like support member, the central apertures in the first, second and third washer-like support members, together with the die in the coverplate, forming an evacuated pressure reference chamber.

31. The apparatus of claim 30 wherein the cover plate is optically transparent.

32. A pressure transducer, comprising:
a pressure sensitive silicon die having a front side exposing piezoresistive means and a back side for receiving pressure from a pressure medium;
a borosilicate glass washer-like support member having first and second end surfaces, one end surface being hermetically bonded to the front side of the die, the glass washer-like support member having a central aperture substantially in register with the piezoresistive means;
a thin-film metal conductor recessed into and substantially level with the other end surface of the glass support member;
means for connecting the thin-film metal conductor to the piezoresistive means;
a silicon washer-like support member having first and second end surfaces, one end surface being hermetically bonded to the other end surface of the glass support member, the silicon support member having a central aperture substantially in register with the central aperture of the glass support member, the silicon support member further comprising an additional aperture substantially in register with the thin-film metal conductor recessed into the other end surface of the glass support member;
electrical terminal means passing through the additional aperture and connected to the thin film metal conductor in register with the aperture; and
means hermetically sealing the additional aperture.

33. The apparatus of claim 32 wherein the silicon support member supports a borosilicate glass coverplate hermetically bonded to the other side of the silicon support member, the central apertures in the glass and silicon washer-like support members, together with the die and the coverplate forming an evacuated pressure reference chamber.

34. The apparatus of claim 32 wherein:
a plurality of thin-film metal conductors are separately recessed into and substantially level with the other surface of the glass support member;
the die comprises a plurality of piezoresistive means;
the means for connecting comprises a plurality of wire bonds, there being a wire bond connected between each thin-film metal conductor and a different one of the piezoresistive means;
the central aperture in the silicon washer-like support member has a diameter larger than the diameter of the central aperture in the glass washer-like support member so that the central aperture in the silicon washer-like support member surrounds the wire bond connections with the thin-film metal conductors;
the silicon washer-like support member comprises a plurality of additional apertures, each substantially in register with a different thin-film metal conductor recessed into the other surface of the glass washer-like support member;

each additional aperture surrounding electrical terminal means connected to the thin-film metal conductor in register with the aperture; and means hermetically sealing each additional aperture.

35. The apparatus of claim 34 wherein the silicon washer-like support member supports a borosilicate glass coverplate hermetically sealed to the other side of the silicon washer-like support member, the central apertures in the glass and silicon washer-like support members, together with the die and the coverplate, forming an evacuated pressure reference chamber.

36. The apparatus of claim 32 wherein the surfaces that are hermetically bonded are bonded by an electrostatic bonding process.

37. A method of fabricating a pressure transducer comprising:

providing a pressure sensitive silicon die having a front side providing access to piezoresistive means therein at least through electrical interconnections provided thereto;

providing a pressure vessel having an aperture and having interconnection means permitting electrical contact to be made to the electrical interconnections other than entirely through the aperture; and mounting the die permanently sealed against the pressure vessel with the front side of the die facing the aperture and with the electrical interconnections electrically joined together with the interconnection means.

38. The method of claim 37 wherein:

the pressure vessel comprises an optically transparent coverplate apposed to the piezoresistive means; and the piezoresistive means are lazer-trimmed after assembly of the transducer.

* * * * *